US012474029B2

(12) United States Patent
Hayashi et al.

(10) Patent No.: US 12,474,029 B2
(45) Date of Patent: Nov. 18, 2025

(54) LUMINESCENT EMBLEM

(71) Applicant: TOYODA GOSEI CO., LTD., Kiyosu (JP)

(72) Inventors: Kento Hayashi, Kiyosu (JP); Yuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/924,082

(22) Filed: Oct. 23, 2024

(65) Prior Publication Data

US 2025/0155100 A1 May 15, 2025

(30) Foreign Application Priority Data

Nov. 10, 2023 (JP) ................................ 2023-192322

(51) Int. Cl.
*F21S 41/33* (2018.01)
*F21S 41/143* (2018.01)
*F21S 41/145* (2018.01)
*F21S 41/151* (2018.01)
*F21S 41/20* (2018.01)
(Continued)

(52) U.S. Cl.
CPC ........... *F21S 41/334* (2018.01); *F21S 41/143* (2018.01); *F21S 41/151* (2018.01); *F21S 41/2805* (2024.05); *F21S 41/145* (2018.01); *F21S 41/337* (2018.01); *F21S 41/365* (2018.01); *F21V 7/0008* (2013.01); *F21V 7/0033* (2013.01); *F21V 7/0041* (2013.01)

(58) Field of Classification Search
CPC ............ F21S 41/33–365; F21S 41/145; G09F 2007/1882; F21V 7/0008; F21V 7/0033; F21V 7/0041; F21V 7/09; F21V 7/048; B60Q 1/2665; B60R 13/005; G02F 1/133605
See application file for complete search history.

(56) References Cited

U.S. PATENT DOCUMENTS 5,642,933 A * 7/1997 Hitora ..................... F21S 8/083 362/348
8,708,536 B1 * 4/2014 Mathieu ............... B60Q 1/2665 362/494
(Continued)

FOREIGN PATENT DOCUMENTS

JP 2014-141197 A 8/2014

*Primary Examiner* — Colin J Cattanach
(74) *Attorney, Agent, or Firm* — POSZ LAW GROUP, PLC

(57) ABSTRACT

A luminescent emblem includes a housing including a reflection surface, a cover including at least one transmissive part through which visible light transmits, and a substrate on which a light source is mounted. The housing includes a bottom wall portion, an outer peripheral wall portion, and a connection wall portion. The bottom wall portion includes a projection projecting toward the cover. The projection includes a flat portion and an inner peripheral wall portion surrounding the flat portion. The at least one transmissive part includes a transmissive part disposed on a peripheral portion of the cover. The reflection surface includes a primary reflection surface that reflects visible light toward a peripheral side of the housing and a secondary reflection surface that receives and reflects light toward the transmissive part, disposed on the peripheral portion of the cover.

3 Claims, 3 Drawing Sheets

(51) Int. Cl.
*F21S 41/365* (2018.01)
*F21V 7/00* (2006.01)

(56) References Cited

U.S. PATENT DOCUMENTS

| | | | | |
|---|---|---|---|---|
| 2006/0023468 | A1* | 2/2006 | Takahashi | B60R 13/005 362/555 |
| 2006/0291209 | A1* | 12/2006 | Booth | F21V 7/0008 362/249.06 |
| 2008/0192480 | A1* | 8/2008 | Rizkin | F21V 7/04 362/310 |
| 2015/0260365 | A1* | 9/2015 | Kitayama | F21S 43/26 362/519 |

* cited by examiner

LUMINESCENT EMBLEM

CROSS-REFERENCE TO RELATED APPLICATIONS

This application is based upon and claims the benefit of priority from prior Japanese Patent Application No. 2023-192322, filed on Nov. 10, 2023, the entire contents of which are incorporated herein by reference.

BACKGROUND

1. Field

The present disclosure relates to a luminescent emblem.

2. Description of Related Art

Japanese Laid-Open Patent Publication No. 2014-141197 discloses a light emitting device for an emblem. The emblem light emitting device includes a housing having an opening and an outer lens covering the opening of the housing. An emblem is coupled to a surface of the outer lens. The housing and the outer lens define a cavity that accommodates a substrate, a light source mounted on a surface of the substrate located at the housing, and an inner lens arranged between the substrate and the housing to cover the substrate and the light source.

The inner lens controls a reflection direction of light emitted from the light source so that the light is emitted toward the outer lens.

In the emblem light emitting device, when the light transmits through the outer lens, the peripheral edge of the emblem is illuminated.

A conventional luminescent emblem including the above emblem light emitting device needs to have an inner lens to control the reflection direction of the light. Thus, the number of components is increased by the inner lens.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect of the present disclosure, a luminescent emblem includes a housing including an opening that is open outward from a vehicle and a reflection surface that reflects visible light, a cover closing the opening and including at least one transmissive part that is transmissive to the visible light, and a substrate accommodated between the housing and the cover. A light source is mounted on the substrate to emit the visible light toward the reflection surface. The visible light reflected from the housing toward the cover is transmitted through the at least one transmissive part to illuminate the cover. The housing includes a bottom wall portion, an outer peripheral wall portion defining the opening, and a connection wall portion connecting the bottom wall portion and the outer peripheral wall portion. The bottom wall portion includes a projection projecting toward the cover. The projection includes a flat portion on which the substrate is mounted and an inner peripheral wall portion surrounding the flat portion. The at least one transmissive part includes a transmissive part disposed on a peripheral portion of the cover. The reflection surface includes a primary reflection surface disposed on at least one of a peripheral edge of the flat portion and the inner peripheral wall portion and inclined with respect to an optical axis of the light source to reflect the visible light toward a peripheral side of the housing and a secondary reflection surface disposed on the connection wall portion and inclined with respect to the optical axis to receive and reflect the visible light toward the transmissive part disposed on the peripheral portion of the cover.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiments of a luminescent emblem for a vehicle will now be described with reference to FIGS. 1 to 5.

Hereinafter, the front-rear direction of the vehicle will be referred to as a front-rear direction X. The front side and the rear side in the front-rear direction X are simply referred to as frontward and rearward. The sideward direction of the vehicle is referred to as a vehicle-sideward direction Y. The vertical direction of the vehicle when located on a horizontal surface is referred to as a vertical direction Z. The upper side and the lower side of the vertical direction Z are simply referred to as the upper side and the lower side.

First Embodiment

A first embodiment of a luminescent emblem will now be described with reference to FIGS. 1 to 3.

Figure 1:
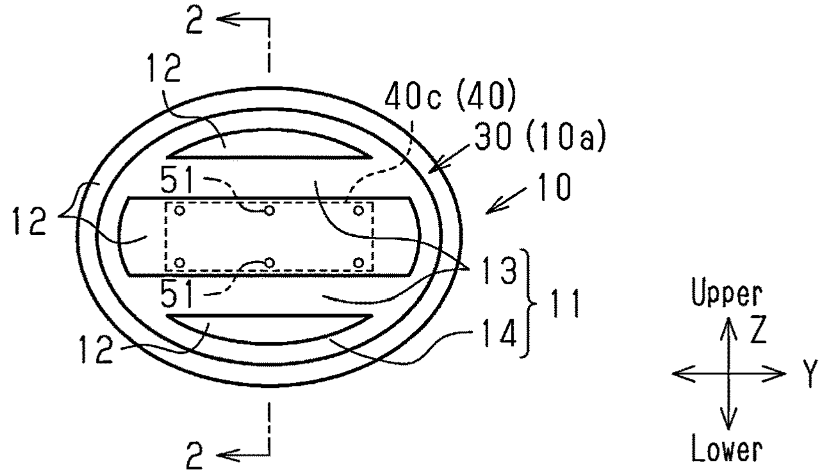
FIG. 1 is a front view showing a luminescent emblem in a first embodiment.
Figure 2:
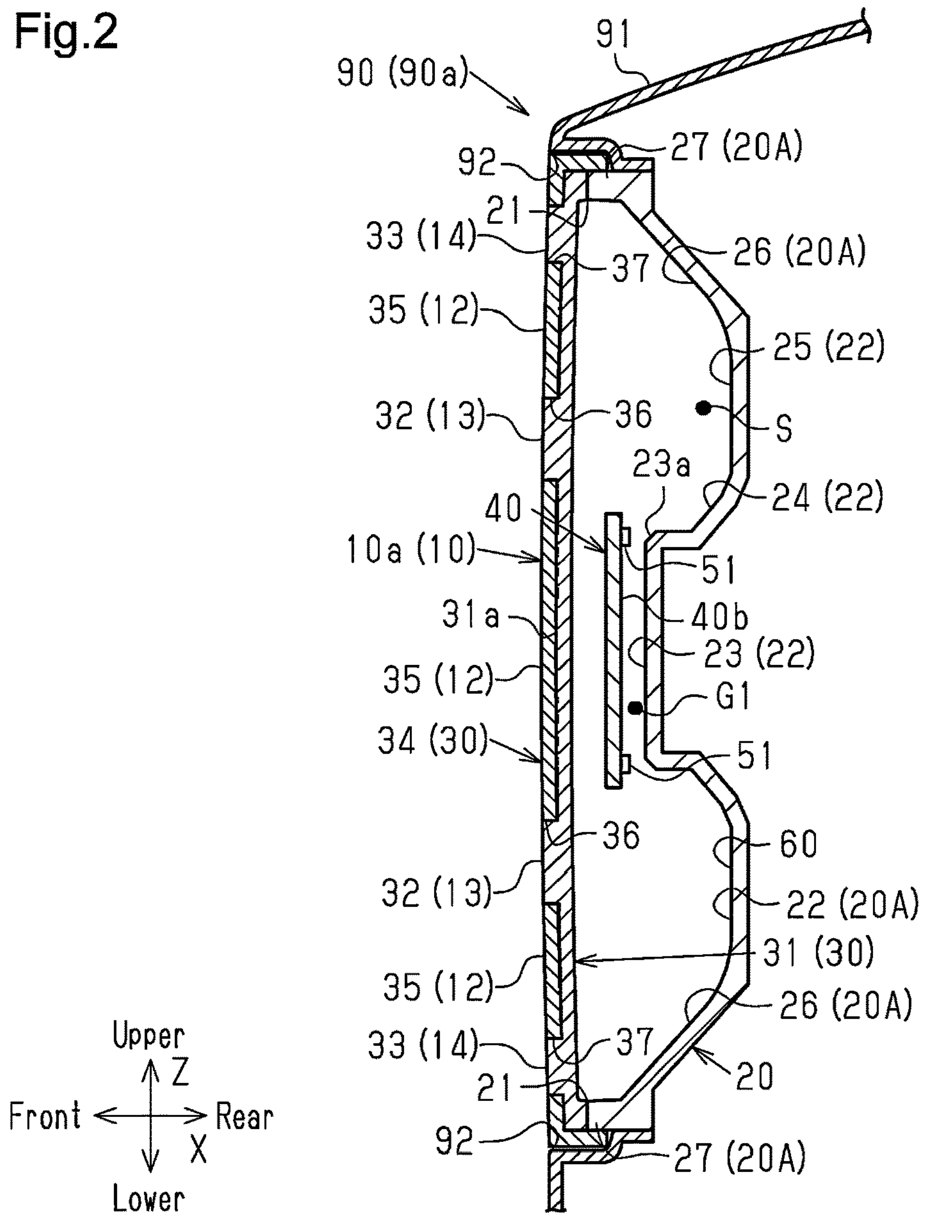
FIG. 2 is a cross-sectional view taken along line 2-2 in FIG. 1.

As shown in FIGS. 1 and 2, an exterior panel 91 defines a front part 90*a* of a vehicle 90 and includes a window 92 open frontward. A luminescent emblem 10 is coupled to the window 92 to decorate the exterior panel 91.

The contour of the luminescent emblem 10 is circular as viewed from the front.

The luminescent emblem 10 includes an ornamental surface 10*a* including an indication region 11 and a background region 12. The indication region 11 shows a logo or the like to the front of the vehicle.

The indication region 11 includes, for example, a main portion 13 indicating a character, a design, or the like, and an annular portion 14 surrounding the main portion 13. In the present embodiment, the main portion 13 represents two straight lines spaced apart from each other in the vertical direction Z. The background region 12 is the part of the ornamental surface 10*a* excluding the indication region 11.

The luminescent emblem 10 includes a housing 20, a cover 30, and a substrate 40 on which light sources 51 are mounted.

Each of the components will now be described.

Housing 20

As shown in FIG. 2, the housing 20 includes an opening 21 open to the front of the vehicle 90 and a wall 20A defining the opening 21.

In the description hereafter, a direction radially from the center of the housing 20 toward the periphery is simply referred to as the peripheral side.

The wall 20A is formed from a resin material in which white light diffuser particles are dispersed. Thus, the wall 20A is entirely white. An example of the resin material includes an acrylonitrile-butadiene-styrene copolymer (ABS) resin. An example of the light diffuser is a metal oxide such as titanium oxide or zinc oxide.

The inner surface of the wall 20A includes a reflection surface 60 that reflects visible light (hereinafter, simply referred to as light).

The wall 20A includes a bottom wall portion 22, an outer peripheral wall portion 27, and a connection wall portion 26. The connection wall portion 26 connects the bottom wall portion 22 and the outer peripheral wall portion 27.

The bottom wall portion 22 includes a first flat portion 23, an inner peripheral wall portion 24, and a second flat portion 25.

The first flat portion 23 is plate-shaped and extends in the vehicle-sideward direction Y and the vertical direction Z. The first flat portion 23 is located in the center of the bottom wall portion 22 in the vertical direction Z.

The inner peripheral wall portion 24 extends rearward from a peripheral edge 23*a* of the first flat portion 23 and includes a rear end that is bent and inclined toward the peripheral side of the housing 20.

The second flat portion 25 extends from an outer edge of the inner peripheral wall portion 24 toward the peripheral side and is continuous with the connection wall portion 26. The second flat portion 25 is plate-shaped and extends in the vehicle-sideward direction Y and the vertical direction Z.

The first flat portion 23 and the inner peripheral wall portion 24 entirely form a projection projecting frontward from the second flat portion 25. That is, in the present embodiment, the first flat portion 23 corresponds to a flat portion according to the present disclosure.

As shown in FIG. 2, the connection wall portion 26 extends frontward from an outer edge of the second flat portion 25 and is inclined with respect to the front-rear direction X. More specifically, as the connection wall portion 26 extends frontward, the connection wall portion 26 is inclined toward the peripheral side of the housing 20.

The outer peripheral wall portion 27 is bent and extends frontward from the connection wall portion 26. The outer peripheral wall portion 27 includes a front end defining the opening 21.

Cover 30

As shown in FIGS. 1 and 2, the cover 30 includes the ornamental surface 10*a* and is coupled to the housing 20 and closes the opening 21 from the front. More specifically, the cover 30 is welded to the front end of the outer peripheral wall portion 27 along the entire perimeter. The welding process includes, for example, ultrasonic welding, laser beam welding, or holt plate welding.

The cover 30 includes an inner portion 31 and an outer portion 34 disposed at the front of the inner portion 31.

The inner portion 31 is an outer lens formed from a transparent material that is transmissive to visible light. The transparent material includes, for example, acrylic resin such as polymethyl methacrylate resin (PMMA) or transparent resin such as polycarbonate (PC) resin. The term "transparent" used in the present embodiment includes colorless transparency and colored transparency (pigmented transparency).

The inner portion 31 includes a front surface 31*a* formed integrally with a first exposed part 32 and a second exposed part 33, each of which is a projection projecting frontward.

The first exposed part 32 is disposed at a position of the ornamental surface 10*a* corresponding to the main portion 13 of the indication region 11.

The second exposed part 33 is disposed at a position of the ornamental surface 10*a* corresponding to the annular portion 14 of the indication region 11.

The outer portion 34 includes a light blocking part 35 that blocks light and transmissive parts 36 and 37 surrounded by the light blocking part 35. The transmissive parts 36 and 37 are transmissive to visible light.

The light blocking part 35 forms the background region 12 of the ornamental surface 10*a*.

The light blocking part 35 is formed from a mixed material in which, for example, a resin material such as PC resin is mixed with a black pigment such as carbon black.

The transmissive parts 36 and 37 are connection holes connecting the inside and the outside of the outer portion 34. The transmissive part 36 exposes the first exposed part 32 in a frontward direction of the vehicle 90 at a central portion of the cover 30. The transmissive part 37 exposes the second exposed part 33 in a frontward direction of the vehicle 90 at a peripheral portion of the cover 30. More specifically, the transmissive parts 36 and 37 and the exposed parts 32 and 33 form the indication region 11 of the ornamental surface 10*a*. The central portion of the cover 30 is located radially inward from the annular portion 14. The peripheral portion of the cover 30 is located at the peripheral side of the central portion of the cover 30.

The substrate 40 is accommodated in a space S defined between the cover 30 and the housing 20.

Substrate 40 and Light Source 51

As shown in FIGS. 1 and 2, the substrate 40 is coupled to the first flat portion 23 of the housing 20. The substrate 40 is spaced apart by a gap G1 from the first flat portion 23 in the front-rear direction X and is coupled to the first flat portion 23 by a fastening member, which is not shown in the drawings.

The substrate 40 is flat and extends in the vehicle-sideward direction Y and the vertical direction Z. In the present embodiment, the substrate 40 has the form of a rectangular plate having long sides in the vehicle-sideward direction Y (refer to FIG. 1). Of the peripheral edges of the substrate 40, two long side portions 40*c* arranged next to each other in the vertical direction Z are disposed inward from the main portion 13 in the vertical direction Z.

The light sources 51 are mounted on a rear surface 40*b* of the substrate 40. An example of the light source 51 is a light emitting diode (LED).

As shown in FIG. 1, multiple (in the present embodiment, three) light sources 51 are arranged on the upper side of the rear surface 40*b* and separated from each other in the vehicle-sideward direction Y.

Also, multiple (in the present embodiment, three) light sources 51 are arranged on the lower side of the rear surface 40*b* and separated from each other in the vehicle-sideward direction Y.

As shown in FIG. 2, each of the light sources 51 is opposed to the peripheral edge 23*a* of the first flat portion 23 in the front-rear direction X.

Figure 3:
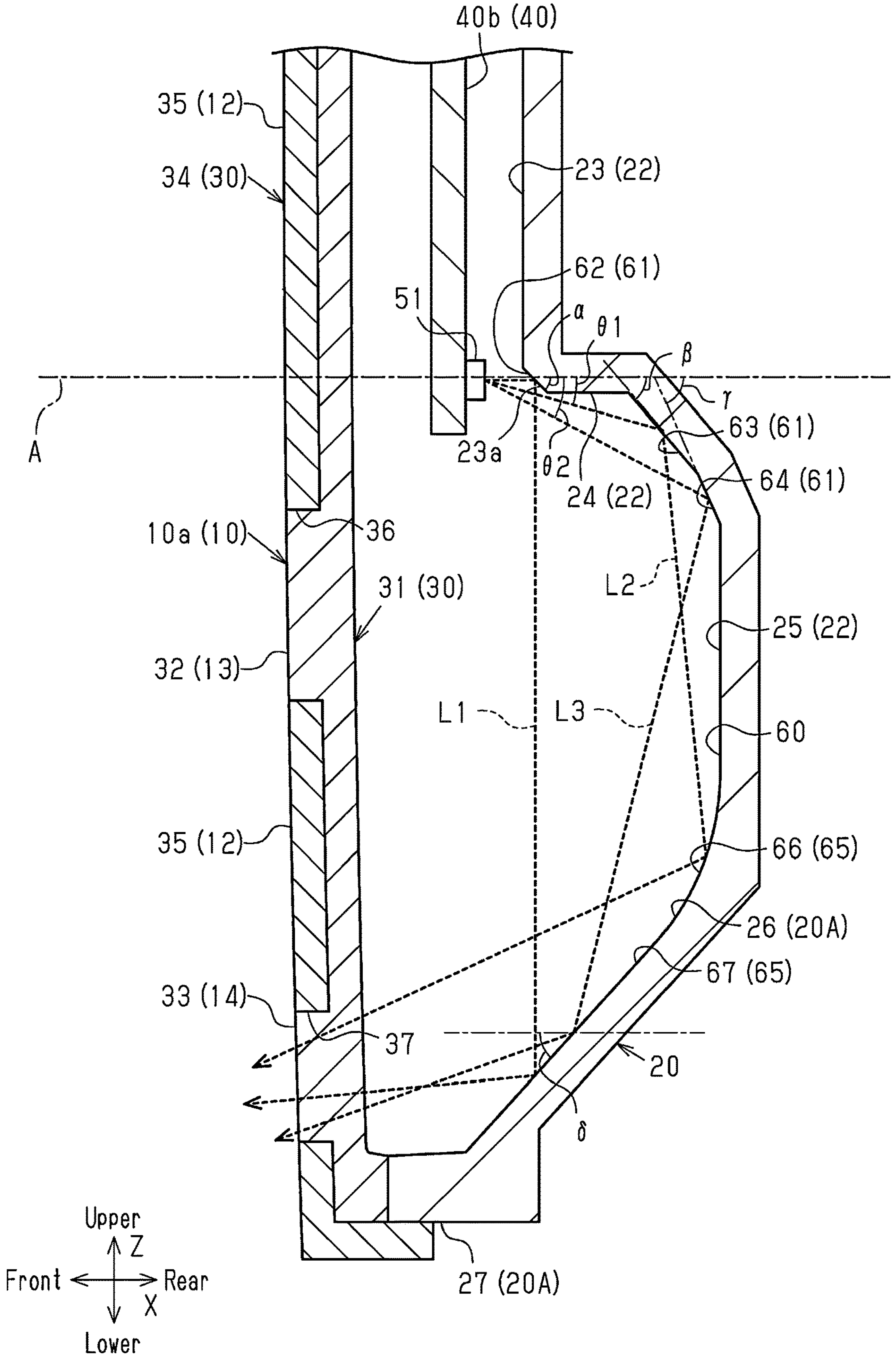
FIG. 3 is an enlarged cross-sectional view of a portion shown in FIG. 2.

As shown in FIGS. 2 and 3, the light source 51 emits light rearward toward the reflection surface 60; more specifically, the peripheral edge 23*a* of the first flat portion 23. The light source 51 has an optical axis A extending in an axial direction that conforms to the front-rear direction X.

Reflection Surface 60

The reflection surface 60 will now be described.

As shown in FIG. 3, the reflection surface 60 includes a primary reflection surface 61, which is disposed on the first flat portion 23 and the inner peripheral wall portion 24, and a secondary reflection surface 65, which is disposed on the connection wall portion 26.

The primary reflection surface 61 includes a first inclined surface 62, a second inclined surface 63, and a third inclined surface 64 that are inclined with respect to the optical axis A at a different inclination angle.

The entirety of the primary reflection surface 61 is configured to reflect light emitted from the light source 51 toward the peripheral side of the housing 20.

The first inclined surface 62 is disposed on the peripheral edge 23*a* of the first flat portion 23. Thus, the first inclined surface 62 is opposed to the light source 51 in the front-rear direction X.

As the first inclined surface 62 extends rearward, the first inclined surface 62 is inclined toward the peripheral side of the housing 20. The first inclined surface 62 and the optical axis A form an inclination angle $\alpha$ ($\alpha>0°$) that is set so that light L1 emitted from the light source 51 along the optical axis A is reflected toward the secondary reflection surface 65. It is preferred that the inclination angle $\alpha$ is set to 45°.

The second inclined surface 63 and the third inclined surface 64 are disposed at the rear end of the inner peripheral wall portion 24.

As the second inclined surface 63 extends rearward, the second inclined surface 63 is inclined toward the peripheral side of the housing 20. The second inclined surface 63 and the optical axis A form an inclination angle $\beta$ that is greater than the inclination angle $\alpha$ ($\alpha<\beta$) so that light L2 emitted from the light source 51 at an emission angle and inclined with respect to the optical axis A by a first angle $\theta 1$ is reflected toward the secondary reflection surface 65. It is preferred that the inclination angle $\beta$ is set to 60°.

The third inclined surface 64 is inclined from an outer edge of the second inclined surface 63 and is continuous with an inner surface of the second flat portion 25.

As the third inclined surface 64 extends rearward, the third inclined surface 64 is inclined toward the peripheral side of the housing 20. The third inclined surface 64 and the optical axis A form an inclination angle $\gamma$ that is greater than the inclination angle $\beta$ so that light L3 emitted from the light sources 51 at an emission angle that is inclined with respect to the optical axis A by a second angle $\theta 2$ ($\theta 1<\theta 2$) that is greater than the first angle $\theta 1$ toward the secondary reflection surface 65. It is preferred that the inclination angle $\gamma$ is set to 75°.

The secondary reflection surface 65 includes a recessed surface 66 and a fourth inclined surface 67 inclined with respect to the optical axis A.

The entirety of the secondary reflection surface 65 is configured to receive and reflect light toward the transmissive part 37, which is disposed at the peripheral portion of the cover 30.

The recessed surface 66 is curved from an inner surface of the second flat portion 25 and extends frontward. It is preferred that the radius of curvature of the recessed surface 66 is set to, for example, 15 mm.

The fourth inclined surface 67 is inclined from a peripheral edge of the recessed surface 66 and is continuous with the inner surface of the outer peripheral wall portion 27.

As the fourth inclined surface 67 extends frontward, the fourth inclined surface 67 is inclined toward the peripheral side of the housing 20. It is preferred that the fourth inclined surface 67 has an inclination angle $\delta$ that is set to, for example, 45°.

The fourth inclined surface 67 is opposed to the second exposed part 33 in the front-rear direction X.

The operation of the first embodiment will now be described.

As shown in FIG. 3, when light is emitted from the light source 51, the light is reflected by the reflection surface 60 of the housing 20 toward the cover 30. When the light enters the cover 30, the light is transmitted through the transmissive parts 36 and 37 and emitted to the front of the vehicle 90. Thus, the first exposed part 32 and the second exposed part 33 of the cover 30 emit light. That is, the indication region 11 of the luminescent emblem 10 emits light. For the sake of illustration, FIG. 3 does not show light entering the transmissive part 36.

The reflection surface 60 includes the primary reflection surface 61 and the secondary reflection surface 65. Hence, part of the light emitted from the light source 51 is reflected by the primary reflection surface 61 toward the peripheral side of the housing 20. Thus, the light is more likely to be received by the secondary reflection surface 65.

The light is reflected by the secondary reflection surface 65 toward the transmissive part 37, which is disposed on the peripheral portion of the cover 30. Thus, the light emitted from the light source 51 is transmitted efficiently through the transmissive part 37.

More specifically, light L1 emitted from the light source 51 along the optical axis A is reflected toward the peripheral side of the housing 20 by the first inclined surface 62, which is disposed on the peripheral edge 23*a* of the first flat portion 23. Thus, the light L1 is more likely to be received by the secondary reflection surface 65. The inclination angle $\alpha$ of the first inclined surface 62 may be set to 45° (inclination angle $\alpha$=45°). This ensures that the light L1 is reflected toward the fourth inclined surface 67 of the secondary reflection surface 65. Thus, the efficiency of transmitting the light L1 through the transmissive part 37 is enhanced.

The light L2 emitted from the light source 51 at an emission angle that is inclined with respect to the optical axis A by the first angle $\theta 1$ is reflected toward the peripheral side of the housing 20 by the second inclined surface 63, which is disposed on the inner peripheral wall portion 24. Thus, the light L2 is more likely to be received by the secondary reflection surface 65. The inclination angle $\beta$ of the second inclined surface 63 may be set to 60° (inclination angle β=60°). This ensures that when light L2 is emitted from the light source 51 at an emission angle inclined with respect to the optical axis A by 15° (θ1=15°), the light L2 is reflected toward the recessed surface 66 of the secondary reflection surface 65. Thus, the efficiency of transmitting the light L2 through the transmissive part 37 is enhanced. The radius of curvature of the recessed surface 66 may be set to 15 mm. This ensures that the light L2 is reflected toward the transmissive part 37.

The light L3 emitted from the light source 51 at an emission angle inclined with respect to the optical axis A by the second angle θ2 is reflected toward the peripheral side of the housing 20 by the third inclined surface 64, which is disposed on the inner peripheral wall portion 24. Thus, the light L3 is more likely to be received by the secondary reflection surface 65. The inclination angle γ of the third inclined surface 64 may be set to 75° (inclination angle γ=75°). This ensures that when light L3 is emitted from the light source 51 at an emission angle (θ2=30°) inclined with respect to the optical axis A by 30°, the light L3 is reflected toward the fourth inclined surface 67 of the secondary reflection surface 65. Thus, the efficiency of transmitting the light L3 through the transmissive part 37 is enhanced.

The first embodiment has the advantages described below.

(1-1) The luminescent emblem 10 includes the housing 20 including the reflection surface 60 configured to reflect light, the cover 30 closing the opening 21 and including the transmissive parts 36 and 37 being transmissive to light, and the substrate 40 accommodated between the housing 20 and the cover 30. The light source 51 configured to emit light toward the reflection surface 60 is mounted on the substrate 40. The housing 20 includes the bottom wall portion 22, the outer peripheral wall portion 27 defining the opening 21, and the connection wall portion 26 connecting the bottom wall portion 22 and the outer peripheral wall portion 27. The bottom wall portion 22 includes a projection projecting toward the cover 30. The projection includes the first flat portion 23 on which the substrate 40 is mounted and the inner peripheral wall portion 24 surrounding the first flat portion 23. The reflection surface 60 includes the primary reflection surface 61 and the secondary reflection surface 65. The primary reflection surface 61 is disposed on at least one of the peripheral edge 23*a* of the first flat portion 23 and the inner peripheral wall portion 24 and is inclined with respect to the optical axis A of the light source 51 to reflect light toward the peripheral side of the housing 20. The secondary reflection surface 65 is disposed on the connection wall portion 26 and is inclined with respect to the optical axis A to receive and reflect light toward the transmissive part 37, which is disposed on the peripheral portion of the cover 30.

Such a structure produces the above-described operation. This enhances the efficiency of transmitting the light emitted from the light source 51 through the transmissive part 37, which is disposed on the peripheral portion, without arranging a separate member controlling a reflection direction of light such as an inner lens.

Thus, while reducing the number of components, the cover 30 emits light efficiently.

(1-2) The primary reflection surface 61 includes the first inclined surface 62 and the second inclined surface 63 differing from each other in an inclination angle inclined with respect to the optical axis A. The first inclined surface 62 is disposed on the peripheral edge 23*a* of the first flat portion 23 and is opposed to the light source 51 in the front-rear direction X. The first inclined surface 62 reflects the light L1 emitted from the light source 51 along the optical axis A toward the secondary reflection surface 65. The second inclined surface 63 is disposed on the inner peripheral wall portion 24 and reflects the light L2 emitted from the light source 51 at an emission angle inclined with respect to the optical axis A by the first angle θ1 toward the secondary reflection surface 65.

In this structure, the first inclined surface 62, disposed on the peripheral edge 23*a* of the first flat portion 23, and the second inclined surface 63, disposed on the inner peripheral wall portion 24, are located at two different positions of the primary reflection surface 61. Thus, the two lights L1 and L2 each having a different emission angle from the light source 51 are reflected toward the secondary reflection surface 65. The lights L1 and L2 are reflected by the secondary reflection surface 65 toward the transmissive part 37, which is disposed at the peripheral portion. Hence, as compared to a structure in which the primary reflection surface 61 includes only one of the first inclined surface 62 and the second inclined surface 63, the lights L1 and L2 emitted from the light source 51 are transmitted more efficiently through the transmissive part 37, which is disposed at the peripheral portion.

Thus, while reducing the number of components, the cover 30 emits light more efficiently.

(1-3) The primary reflection surface 61 includes the third inclined surface 64 differing from the first inclined surface 62 and the second inclined surface 63 in the inclination angle from the optical axis A. The third inclined surface 64 is disposed on the inner peripheral wall portion 24 toward the peripheral side from the second inclined surface 63 and reflects the light L3 emitted from the light sources 51 at an emission angle inclined with respect to the optical axis A by the second angle θ2 greater than the first angle θ1 toward the secondary reflection surface 65.

In this structure, the first inclined surface 62, disposed on the peripheral edge 23*a* of the first flat portion 23, the second inclined surface 63, disposed on the inner peripheral wall portion 24, and the third inclined surface 64 are located at three different positions of the primary reflection surface 61. Thus, the three lights L1, L2, and L3 each having a different emission angle from the light source 51 are reflected toward the secondary reflection surface 65. The lights L1, L2, and L3 are reflected by the secondary reflection surface 65 toward the transmissive part 37, which is disposed at the peripheral portion. Thus, the lights L1, L2, and L3 emitted from the light source 51 are transmitted more efficiently through the transmissive part 37, which is disposed at the peripheral portion.

Thus, while reducing the number of components, the cover 30 emits light more efficiently.

Second Embodiment

A second embodiment of a luminescent emblem will now be described with reference to FIGS. 4 and 5 focusing on the differences from the first embodiment. In the second embodiment, each component may be denoted by a reference numeral "1" obtained by adding "100" to the reference numeral "" of the same or corresponding component of the first embodiment. Thus, the overlapping description will be omitted.

Luminescent Emblem 110

Figure 4:
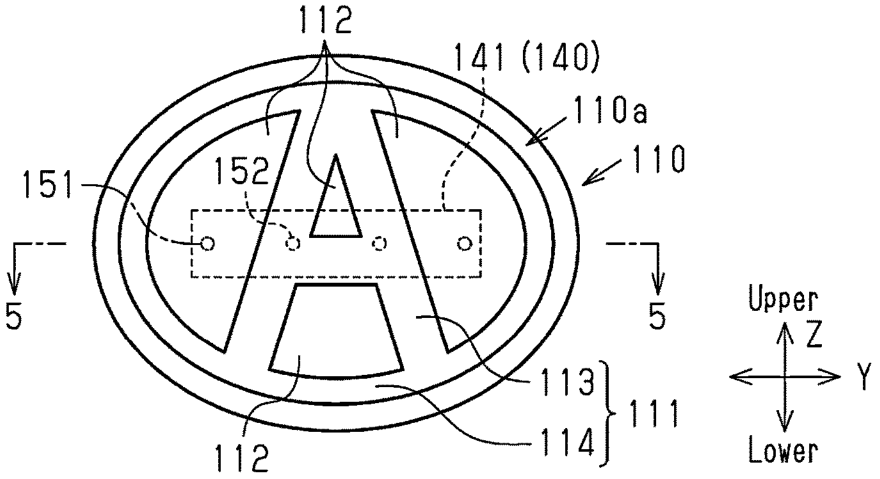
FIG. 4 is a front view of a luminescent emblem in a second embodiment.

As shown in FIG. 4, the luminescent emblem 110 includes an ornamental surface 110*a* including an indication region 111 and a background region 112. The indication region 111 shows a logo or the like to the front of a vehicle 190.

The indication region 111 includes a main portion 113 and an annular portion 114 surrounding the main portion 113. In the present embodiment, the main portion 113 shows the Roman letter "A." The background region 112 is the part of the ornamental surface 110*a* excluding the indication region 111.

The luminescent emblem 110 includes a housing 120, a cover 130, and a substrate 140 on which first light sources 151 and second light sources 152 are mounted.

Housing 120

Figure 5:
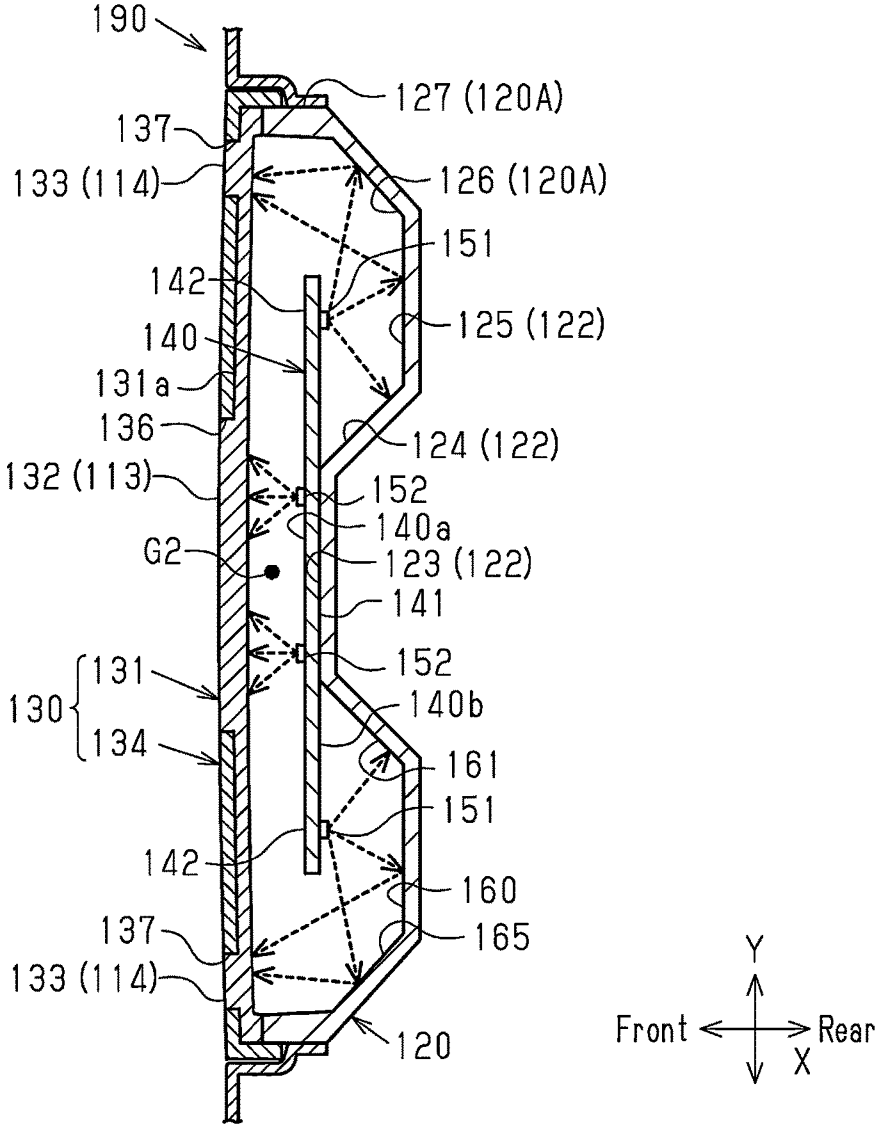
FIG. 5 is a cross-sectional view taken along line 5-5 in FIG. 4.

As shown in FIG. 5, a wall 120A includes a bottom wall portion 122, an outer peripheral wall portion 127, and a connection wall portion 126.

The bottom wall portion 122 includes a first flat portion 123, an inner peripheral wall portion 124, and a second flat portion 125. The first flat portion 123 and the inner peripheral wall portion 124 entirely form a projection projecting frontward from the second flat portion 125. That is, in the present embodiment, the first flat portion 123 corresponds to a flat portion according to the present disclosure.

Cover 130

As shown in FIGS. 4 and 5, the cover 130 includes an inner portion 131 and an outer portion 134 disposed at the front of the inner portion 131.

The inner portion 131 includes a front surface 131*a* formed integrally with a first exposed part 132 and a second exposed part 133, each of which is a projection projecting frontward.

The first exposed part 132 is disposed at a position of the ornamental surface 110*a* corresponding to the main portion 113 of the indication region 111.

The second exposed part 133 is disposed at a position of the ornamental surface 110*a* corresponding to the annular portion 114 of the indication region 111.

Substrate 140, First Light Source 151, and Second Light Source 152

As shown in FIG. 5, the substrate 140 is coupled to the first flat portion 123 of the housing 120. In the present embodiment, the substrate 140 is coupled to the first flat portion 123 with no gap in the front-rear direction X.

The substrate 140 is flat and extends in the vehicle-sideward direction Y and the vertical direction Z. In the present embodiment, the substrate 140 has the form of a rectangular plate having long sides in the vehicle-sideward direction Y (refer to FIG. 4).

The substrate 140 includes an opposing part 141 opposed to the first flat portion 123 in the front-rear direction X and an extension 142 extending from the opposing part 141 toward the peripheral side from the first flat portion 123.

The opposing part 141 is spaced apart by a gap G2 from the first exposed part 132 and opposed to the first exposed part 132 in the front-rear direction X.

Multiple (two in the present embodiment) first light sources 151 are mounted on a portion of a rear surface 140*b* of the substrate 140 forming the extension 142.

Each of the first light sources 151 is opposed to the second flat portion 125 in the front-rear direction X.

The first light sources 151 emit light toward a rearward reflection surface 160; more specifically, the inner peripheral wall portion 124 (primary reflection surface 161), the second flat portion 125, and the connection wall portion 126 (secondary reflection surface 165). The first light source 151 has an optical axis (not shown) extending in an axial direction that conforms to the front-rear direction X.

Multiple (two in the present embodiment) second light sources 152 are mounted on a portion of a front surface 140*a* of the substrate 140 forming the opposing part 141.

The second light sources 152 are opposed to the first exposed part 132 in the front-rear direction X. The second light sources 152 directly emit light toward a transmissive part 136 disposed in the center of the cover 130. The second light source 152 has an optical axis (not shown) extending in an axial direction that conforms to the front-rear direction X.

The operation and advantages of the second embodiment will now be described.

(2-1) The substrate 140 includes an opposing part 141 opposed to the first flat portion 123 in the front-rear direction X and an extension 142 extending from the opposing part 141 toward the peripheral side from the first flat portion 123.

In this structure, the substrate 140 includes the extension 142. Thus, the surface area of the substrate 140 is increased by the extension 142. This improves the heat dissipation efficiency of the substrate 140.

(2-2) The first light sources 151 are mounted on the extension 142. The second light sources 152 are mounted on the opposing part 141 to emit light directly toward the transmissive part 136, which is disposed in the center of the cover 130.

In this structure, the first light sources 151 are disposed on the extension 142 of the substrate 140. Thus, the first light sources 151 are located closer to the secondary reflection surface 165 than those in a structure in which, for example, the opposing part 141 is spaced apart from the first flat portion 123 and the first light sources 151 are disposed on the opposing part 141. In this structure, light emitted from the first light sources 151 is more likely to be received directly by the secondary reflection surface 165. This further increases the efficiency of transmission of light emitted from the first light sources 151 through a transmissive part 137 disposed at a peripheral portion.

As the first light sources 151 are arranged closer to the secondary reflection surface 165, it is difficult to efficiently transmit light emitted from the first light sources 151 to the transmissive part 136 disposed in the center of the cover 130. In this regard, in the above structure, the second light sources 152 are disposed on the opposing part 141 of the substrate 140 and directly emit light toward the transmissive part 136 disposed in the center. Thus, the light emitted from the second light sources 152 is transmitted efficiently to the transmissive part 136 disposed in the center.

This increases the efficiency of light emission from the cover 130.

MODIFIED EXAMPLES

The embodiments described above may be modified as follows. The embodiments and the following modified examples may be combined as long as the combined modified examples remain technically consistent with each other.

In the embodiments, the light blocking part 35 is formed from a mixed material in which, for example, a resin material such as PC resin is mixed with a black pigment such as carbon black. Alternatively, for example, a base may be formed from a resin material such as PC resin or ABS resin, and coating having a light-blocking property or plating may be applied to the surface of the base to form the light blocking part 35.

The housings 20 and 120 are not limited to those formed from a resin material in which white light diffuser particles are dispersed as described in the embodiments. For example, the wall may be formed from a resin material, and a coating film in which white light diffuser particles are dispersed may be applied to the inner surface of the wall.

In the first embodiment, the luminescent emblem 10 includes the three inclined surfaces 62, 63, 64 as the primary reflection surface 61. However, the number of primary reflection surfaces 61 is not limited to three and may be changed. In an example, an inclined surface having an inclination angle that is greater than the inclination angle γ with respect to the optical axis A may be additionally disposed toward the peripheral side from the third inclined surface 64. One of the second inclined surface 63 and the third inclined surface 64 may be omitted. When the second inclined surface 63 is omitted, the recessed surface 66 may be omitted from the secondary reflection surface 65.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A luminescent emblem, comprising:

a housing including an opening that is open outward from a vehicle and a reflection surface that reflects visible light;

a cover closing the opening and including at least one transmissive part that is transmissive to the visible light; and a substrate accommodated between the housing and the cover, wherein a light source is mounted on the substrate to emit the visible light toward the reflection surface, wherein the visible light reflected from the housing toward the cover is transmitted through the at least one transmissive part to illuminate the cover, the housing includes a bottom wall portion, an outer peripheral wall portion defining the opening, and a connection wall portion connecting the bottom wall portion and the outer peripheral wall portion, the bottom wall portion includes a projection projecting toward the cover, the projection includes a flat portion on which the substrate is mounted and an inner peripheral wall portion surrounding the flat portion, the at least one transmissive part includes a transmissive part disposed on a peripheral portion of the cover, the reflection surface includes a primary reflection surface disposed on at least one of a peripheral edge of the flat portion and the inner peripheral wall portion and inclined with respect to an optical axis of the light source to reflect the visible light toward a peripheral side of the housing, and a secondary reflection surface disposed on the connection wall portion and inclined with respect to the optical axis to receive and reflect the visible light toward the transmissive part disposed on the peripheral portion of the cover, the primary reflection surface includes a first inclined surface and a second inclined surface differing from each other in an inclination angle inclined with respect to the optical axis, the first inclined surface is disposed on the peripheral edge of the flat portion and is opposed to the light source in an axial direction in which the optical axis extends, the first inclined surface reflects the visible light emitted from the light source along the optical axis toward the secondary reflection surface, and the second inclined surface is disposed on the inner peripheral wall portion and reflects the visible light emitted from the light source toward the secondary reflection surface at an emission angle inclined with respect to the optical axis by a first angle.

2. The luminescent emblem according to claim 1, wherein a peripheral side of the housing is referred to as a peripheral side, the primary reflection surface includes a third inclined surface differing from the first inclined surface and the second inclined surface in an inclination angle from the optical axis, and the third inclined surface is disposed on the inner peripheral wall portion toward the peripheral side from the second inclined surface and reflects the visible light emitted from the light source toward the secondary reflection surface at an emission angle inclined with respect to the optical axis by a second angle that is greater than the first angle.

3. The luminescent emblem according to claim 1, wherein a peripheral side of the housing is referred to as a peripheral side, the substrate includes an opposing part opposed to the flat portion in an axial direction in which the optical axis extends and an extension extending from the opposing part toward the peripheral side from the flat portion, the at least one transmissive part includes a transmissive part disposed in a center of the cover, the light source is a first light source, the first light source being mounted on the extension, and a second light source is mounted on the opposing part and directly emits the visible light toward the transmissive part, which is disposed in the center of the cover.

* * * * *